(12) United States Patent
Tornéus

(10) Patent No.: US 12,293,607 B2
(45) Date of Patent: *May 6, 2025

(54) HOLOGRAPHIC EYE IMAGING DEVICE

(71) Applicant: TOBII AB, Danderyd (SE)

(72) Inventor: Daniel Tornéus, Danderyd (SE)

(73) Assignee: Tobii AB, Danderyd (SE)

( * ) Notice: Subject to any disclaimer, the term of this patent is extended or adjusted under 35 U.S.C. 154(b) by 159 days.

This patent is subject to a terminal disclaimer.

(21) Appl. No.: 18/167,363

(22) Filed: Feb. 10, 2023

(65) Prior Publication Data

US 2023/0186682 A1 Jun. 15, 2023

Related U.S. Application Data

(63) Continuation-in-part of application No. 16/834,574, filed on Mar. 30, 2020, now Pat. No. 11,594,075.

(30) Foreign Application Priority Data

Mar. 29, 2019 (SE) .................................... 1950397-8

(51) Int. Cl.
*G06V 40/00* (2022.01)
*G02B 5/18* (2006.01)
*G02B 5/32* (2006.01)
*G02B 27/42* (2006.01)
*G03H 1/02* (2006.01)
(Continued)

(52) U.S. Cl.
CPC ........... *G06V 40/19* (2022.01); *G02B 5/1876* (2013.01); *G02B 5/32* (2013.01); *G02B 27/4205* (2013.01); *G03H 1/0248* (2013.01); *G06F 3/013* (2013.01)

(58) Field of Classification Search
CPC .... G06V 40/19; G06V 10/145; G02B 5/1876; G02B 5/32; G02B 27/4205; G02B 27/0081; G02B 2027/0138; G02B 27/0093; G02B 2027/0174; G02B 2027/0178;
(Continued)

(56) References Cited

U.S. PATENT DOCUMENTS 5,980,041 A 11/1999 Strachan
9,442,292 B1 9/2016 Gao et al.
(Continued)

FOREIGN PATENT DOCUMENTS

CN 103761519 4/2014
CN 104937519 9/2015
CN 109491508 3/2019

OTHER PUBLICATIONS

U.S. Appl. No. 16/834,574, "Notice of Allowance", Oct. 31, 2022, 5 pages.
(Continued)

*Primary Examiner* — Frank F Huang
(74) *Attorney, Agent, or Firm* — Christopher Ignatius Moylan

(57) ABSTRACT

An eye tracking device for tracking an eye is described. The eye tracking device comprises: a first diffractive optical element, DOE, arranged in front of the eye, an image module, wherein the image module is configured to capture an image of the eye via the first DOE. The first DOE is adapted to direct a first portion of incident light reflected from the eye, towards the image module. The eye tracking device is characterized in that the first DOE is configured to provide a lens effect.

19 Claims, 3 Drawing Sheets

(51) Int. Cl.
*G06F 3/01* (2006.01)
*G06V 40/19* (2022.01)

(58) Field of Classification Search
CPC ............. G02B 27/0172; G03H 1/0248; G03H 2270/55; G06F 3/013; G06F 3/011; G06F 3/0304
See application file for complete search history.

(56) References Cited

U.S. PATENT DOCUMENTS

| | | | | |
|---|---|---|---|---|
| 10,217,286 | B1* | 2/2019 | Angel | G06K 9/00302 |
| 10,466,484 | B1* | 11/2019 | Yoon | G02B 27/0176 |
| 10,466,779 | B1* | 11/2019 | Liu | G02B 27/017 |
| 10,502,963 | B1* | 12/2019 | Noble | B29D 11/0073 |
| 11,256,087 | B2 | 2/2022 | Tornèus et al. | |
| 2016/0085300 | A1* | 3/2016 | Robbins | G02B 27/0101 345/633 |
| 2016/0224106 | A1 | 8/2016 | Liu | |
| 2018/0046859 | A1* | 2/2018 | Jarvenpaa | G02B 6/0036 |
| 2018/0275409 | A1* | 9/2018 | Gao | G02B 27/0093 |
| 2018/0307048 | A1* | 10/2018 | Alexander | G03H 1/0248 |
| 2019/0086674 | A1* | 3/2019 | Sinay | G02B 27/283 |
| 2020/0183174 | A1* | 6/2020 | Noui | G02B 27/0179 |
| 2020/0368616 | A1* | 11/2020 | Delamont | A63F 13/25 |
| 2021/0011284 | A1* | 1/2021 | Andreev | G02B 5/1861 |
| 2021/0041948 | A1* | 2/2021 | Berkner-Cieslicki | G06F 3/013 |

OTHER PUBLICATIONS

U.S. Appl. No. 16/834,574, "Notice of Allowance", Aug. 3, 2022, 6 pages.
U.S. Appl. No. 17/677,575, "Non-Final Office Action", Nov. 29, 2022, 10 pages.
Chinese Patent Application No. 202010500200.9, "Office Action", Aug. 24, 2021, 7 pages.

* cited by examiner

HOLOGRAPHIC EYE IMAGING DEVICE

CROSS-REFERENCES TO RELATED APPLICATIONS

This application is a continuation-in-part of U.S. patent application Ser. No. 16/834,574, filed on Mar. 30, 2020, which claims priority to Swedish Application No. 1950397-8, filed Mar. 29, 2019; the content of which are hereby incorporated by reference.

TECHNICAL FIELD

The present invention relates to an eye tracking device for tracking an eye. More specifically, the disclosure relates to an eye tracking device for tracking an eye according to the preamble of claim 1.

BACKGROUND ART

Eye tracking devices, such as e.g. eye tracking glasses, usually have a number of illuminating light sources for illuminating the eyes of a user with multiple glints per eye and one or two cameras for observing the eyes. The pupil of the eye is compared to the position to the glints in the eyes of the light sources to determine a viewing direction of the eye. The camera is usually placed at a large angle to the eyes, e.g. in the frame of the glasses. This is a not a good viewing angle. To make the viewing direction determination easier a number of light sources are used and a computing device is used to make the determination based on image analysis. Many light sources are however expensive and reduce the freedom of design of the eye tracking device. Powerful computing abilities are both expensive and energy consuming. It is also possible to have more than one camera in the eye tracking device. However, multiple cameras increase the cost of the device.

Thus, there is a need in the industry for cheaper eye tracking devices and/or eye tracking devices requiring less complex image analysis to determine the viewing direction of the eyes of a user.

SUMMARY OF THE INVENTION

An object of the present invention is to provide an eye tracking device which at least alleviates one of the problems with the eye tracking devices according to the prior art.

Another object of the present invention is to provide an eye tracking device which alleviates the demands on the camera and its optics.

Another object of the present invention is to provide an eye tracking device which enables a compact design of the eye tracking device.

At least one of these objects is achieved with an eye tracking device according to the independent claim 1.

Further advantages are achieved with the features of the dependent claims.

According to a first aspect of the invention an eye tracking device for tracking an eye is provided. The eye tracking device comprises a first diffractive optical element, DOE, arranged in front of the eye, an image module, wherein the image module is configured to capture an image of the eye via the first DOE. The first DOE is adapted to direct a first portion of incident light reflected from the eye, towards the image module. The eye tracking device is characterized in that the first DOE is configured to provide a lens effect.

With such an eye tracking device the viewing plane or display as well as the camera may be arranged close to the eye. This makes it possible to build very compact devices with an eye tracking device, such as, e.g., virtual reality glasses.

The DOE is preferably arranged such that light which hits the DOE in an angle of incidence is reflected in a first angle, wherein the first angle is different from the angle of incidence of the incident light coming from the eye.

By introducing a lens effect in the DOE it is possible to use an image module with a focal length which is not optimal for the actual distance between the image module and the eye. The lens effect of the DOE is used to compensate for the incorrect focal length of the image module. The thickness of the DOE is small. The DOE may be arranged on/in a polyamide film.

A proper choice of focal length of the lens effect in the DOE places the image in focus. Thus, the DOE enables adaptation of the optical system of the eye tracking device to be adapted to the image module.

The image module may be any suitable camera. The camera may comprise a sensor module of the CMOS type or the CCD type.

The focal length of the DOE may be adapted to direct the first portion of incident light such as to give a sharp image of the eye in the image module. For most applications of the eye tracking device it is desirable to have the image of the eye in focus for the image module.

The eye tracking device may also comprise a second DOE adjacent to the first DOE, wherein the second DOE is adapted to direct a second portion of incident light reflected from the eye, towards the image module. By having two DOEs an image of the eye may be recorded from two different directions. By having images from two different directions the eye tracking may be improved in relation to when only an image from one direction is provided.

The second DOE may be configured to provide a lens effect, wherein the focal length of the second DOE is adapted to direct the second portion of incident light such as to give a sharp image of the eye in the image module, and wherein the focal length of the second DOE is different from the focal length of the first DOE. By having a lens effect in the second DOE it is possible to use an image module which is not adapted for the distance from the eye to the image module for any of the DOEs. Both the first and the second DOEs are adapted to bring the images in focus of the image module irrespective of whether the image has been reflected in the first DOE or the second DOE.

The first DOE and the second DOE may be positioned side by side, seen from the eye, or at least partly overlapping seen from the eye. This is favourable in that this facilitates the mounting of the DOEs in the eye tracking device. DOEs in general are often provided on polymer films. By having the DOEs positioned side by side the DOEs may be arranged in the same polymer film. This facilitates the handling of the DOEs.

When having two DOEs there is, in operation of the eye tracking device, a first portion of light, which, when coming from the eye, is reflected in the first DOE towards the image module, and a second portion of light, which, when coming from the eye, is reflected in the first DOE towards the image module. The first portion of incident light may have a first wavelength and the second portion of incident light may have a second wavelength. The eye tracking device may comprise a first illuminator emitting light at a first wavelength and a second illuminator emitting light at a second wavelength being different from the first wavelength. By having two different wavelengths the images reflected in the first DOE and the second DOE may be separated by their wavelength.

The separation of the wavelengths may be provided by the DOEs. The first DOE only reflects light in a wavelength band around the first wavelength and essentially do not reflect the second wavelength. The second DOE only reflects light in a wavelength band around the second wavelength and essentially does not reflect light at the first wavelength.

However, the first portion of incident light and the second portion of incident light may also have the same wavelength. In this case, the first illuminator and the second illuminator are emitting light at the same wavelength.

The first wavelength, and if applicable the second wavelength, may be in the range of 650-3000 nm, preferably in the range 700-1500 nm, and most preferably in the range 800-1000 nm, i.e., in the near infrared (NIR) wavelength region. With NIR wavelengths the user of the eye tracking device is not disturbed by the light.

One of the wavelengths may be in the range 840-860 nm, and the other wavelength in the range of 930-950 nm. Such a choice of wavelengths provides a good separation between the wavelengths. Also, cheap light sources are available in these wavelength regions. Alternatively, the first wavelength, and if applicable the second wavelength, may be in the range of either 840-860 nm or 930-950 nm.

The at least first DOE may be a holographic optical element such as a volumetric reflection hologram produced by interfering two or more beams or a computer-generated hologram, binary optics made by staircases that approximate the ideal surface relief, a hybrid lens with combined refractive and diffractive power, or a Fresnel zone plate. This type of hologram may be produced at a low cost.

The at least first DOE may be arranged in a polymer film. This is a suitable implementation which is easy to arrange in the eye tracking device. Alternatively, the DOE may be arranged in silver halide on a glass plate or in gelatine.

The polymer film of the DOE may have a thickness in the interval of 10-100 μm. This thickness may allow the DOE to be arranged freestanding.

The at least first DOE may be arranged on a support structure, such as, e.g., a polyamide film. This is a way to give the DOE more rigidity.

The eye tracking device may also comprise a control unit adapted to receive an image captured by the image module, and calculate a viewing angle of the eye. It may be advantageous to have the control unit integrated with the eye tracking device.

Further, the eye tracking device may be a head-worn device. According to some examples, the head-worn device may be one of: glasses for eye-tracking; an augmented reality headset, wherein a transparent viewing plane is either integrated into the DOE, attached to the DOE or arranged in the vicinity of the DOE; or a virtual reality headset, comprising a viewing plane, wherein the DOE is either integrated into the viewing plane, attached in front of the viewing plane or arranged in front of the viewing plane.

BRIEF DESCRIPTION OF THE DRAWINGS

In the following preferred embodiments of the invention will be described with reference to the appended drawings, on which.

DETAILED DESCRIPTION

Figure 1:
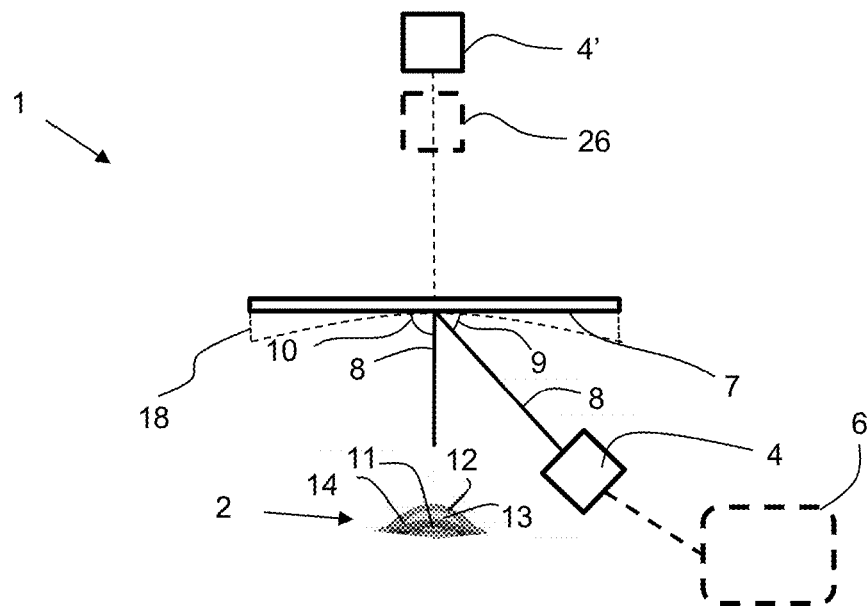
FIG. 1 is a schematic illustration of the eye tracking device according to an embodiment of the invention, with one diffractive optical element, DOE, configured to provide a lens effect and with an illuminator illuminating the eye directly.

In the following description of preferred embodiments of the invention, similar features in the different embodiments will be denoted with the same reference numeral. The drawings are not drawn to scale.

FIG. 1 is a schematic illustration of the eye tracking device according to an embodiment of the invention. FIG. 1 shows an eye tracking device 1 for tracking an eye 2 comprising an image module 4. The image module 4 may be any suitable imaging device, such as a camera, and may comprise any imaging sensor such as a CMOS, a CCD, a time of flight camera/sensor or photo diode. A control unit 6 adapted to receive an image captured by the image module 4 and calculate a viewing angle of the eye may be provided connected to the image module 4. As the control unit 6 is not a part of the eye tracking device 1 it is shown with dashed lines in FIG. 1. A diffractive optical element, DOE, 7 is placed at the same side of the DOE 7 as the eye 2. The image module 4 is adapted to capture an image of the eye 2 via the DOE 7. Light such as ambient light illuminates the eye 2. Some of the light 8 is reflected to the DOE 7. Some of the light 8 that is reflected from the eye 2 towards the DOE 7 hits the DOE at an angle of incidence 10. The DOE 7 is adapted to direct at least a first portion 8 of the incident light reflected from the eye, in a first angle 9 towards the image module. The first angle 9 is different from the angle of incidence 10 of the incident light reflected from the eye 2. The first DOE 7 is configured to provide a first lens effect which in FIG. 1 is indicated with a dashed line 18 to illustrate the function of the lens effect. The lens effect can either be positive, i.e. converging incident light, or negative, i.e. diverging incident light. It is to be noted that the lens effect is obtained by the DOE and does not have the physical extension as indicated by the dashed line 18. The eye 2 has a pupil 11, a cornea 12, an anterior chamber 13 and an iris 14. The focal length of the DOE is preferably such that it corrects the focal length of the optics of the image module 4. In other words, with the DOE the eye is in focus for the image module 4. Thus, no special considerations have to be made when choosing the camera. Any errors in focal length for the implementation in the eye tracking device 1 may be compensated for with the lens effect in the DOE 2. Thus, the image module 4 for the eye tracking device may be chosen with lowest cost as a primary factor, while any errors in the focal length may be compensated for by the lens effect in the DOE. In operation the image module 4 captures images of the eye. The captured images are sent to a control unit 6 which calculates the eye movement based on the captured images. The illuminator 5 may be any suitable light emitting diode, LED. Other suitable illuminators include OLED, lasers and especially VCSEL lasers. In FIG. 1 the image of the eye reflected in the first DOE 7 may be considered to be registered by a first virtual image module 4'. The position of the first virtual image module 4' without the lens effect of the DOE 7 is shown with the dotted line 26. This corresponds to how the virtual cameras would be arranged in a device according to the prior art.

Figure 2:
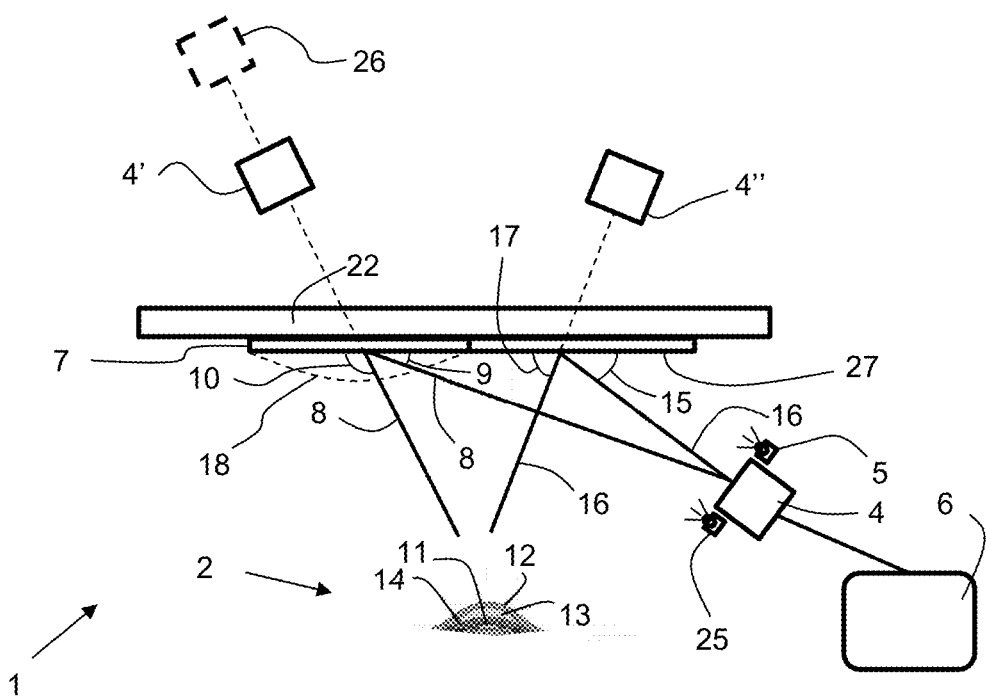
FIG. 2 is a schematic illustration of the eye tracking device according to another embodiment of the invention, having two illuminators illuminating the eye and two DOEs of which one is configured to provide a lens effect.

FIG. 2 is a schematic illustration of an eye tracking device 1 according to another embodiment of the invention. Only the differences between the embodiment of FIG. 1 and the embodiment of FIG. 2 will be explained. The eye tracking device 1 in FIG. 2 comprises a first DOE 7, and a second DOE 27. The first DOE 7 has a lens effect indicated by the dashed line 18. The eye tracking device 1 may further comprise a support structure 22 on which the first DOE 7 and the second DOE 27 are arranged. The support structure 22 may be transparent or opaque. A support structure 22 which is transparent may be made of polyamide or may comprise silver halide. However, a support structure 22 which is transparent may comprise any other suitable transparent material. In FIG. 2, the image module 4 is placed on a same side of the support structure 22 as the eye 2. However, the image module 4 could also be placed on the other side of the support structure 22, in relation to the eye 2.

In the embodiment of FIG. 2, the eye tracking device 1 also comprises a first illuminator 5 illuminating the eye via reflection in the first DOE 7 and a second illuminator 25 illuminating the eye via reflection in the second DOE 27. In the embodiment of FIG. 2 the first illuminator 5 and the second illuminator 25 are arranged adjacent to the image module 4. The first illuminator 5 and the second illuminator 25 may emit light at the same wavelength. Alternatively, in order to improve the eye tracking the first illuminator 5 is configured to emit light at a first wavelength and the second illuminator 25 is configured to emit light at a second different wavelength. In both alternatives the illuminators are preferably LEDs. The wavelengths are in the wavelength range of 700-1000 nm, preferably 800-1000 nm. It is preferred that the wavelengths are in the non-visible near infrared (NIR) wavelength region in the range 800-1000 nm. With NIR wavelengths the user is not disturbed by the light used for eye tracking.

The first DOE is arranged to reflect light in a wavelength band around the first wavelength but essentially not at the second wavelength. Correspondingly, the second DOE is arranged to reflect light in a wavelength band around the second wavelength but essentially not at the first wavelength. The function of the DOE is to move the image of the eye reflected in the first DOE into focus of the image module 4. The function of the DOE indicated by the dashed line 18 may also be explained in the following alternative way. The image of the eye reflected in the first DOE 7 may be considered to be registered by a first virtual image module 4', while the image of the eye reflected in the second DOE 27 may be considered to be registered by a second virtual image module 4". Thanks to the lens effect indicated by the dashed line 18 the first virtual image module 4' is at the same distance from the eye as the second virtual image module 4". The position of the first virtual image module 4' without the lens effect of the DOE 7 is shown with the dotted line 26. This corresponds to how the virtual cameras would be arranged in a device according to the prior art. The illumination of the eye via reflection in the first DOE 7 and the second DOE 27 facilitates the connection of the illuminators 5, 25, and the image module 4 to the control unit 6.

In operation the first illuminator 5 emits light at the first wavelength and the second illuminator 25 emits light at the second wavelength. The light at the first wavelength is reflected in the first DOE 7 and illuminates the eye 2. A first portion 8 of the light at the first wavelength is reflected back from the eye 2 towards the first DOE 7 and is reflected from the first DOE 7 to the image module 4. The first portion 8 of light has an incident angle 10 to the first DOE 7 and a reflection angle 9 from the first DOE 7. The incident angle 10 is different from the reflection angle 9. Essentially no light at the first wavelength is reflected in the second DOE 27. The light at the second wavelength is reflected in the second DOE 27 and illuminates the eye 2. A second portion 16 of the light at the second wavelength is reflected back from the eye 2 towards the second DOE 27 and is reflected from the second DOE 27 to the image module 4. The second portion 16 of light has an incident angle 17 to the second DOE 27 and a reflection angle 15 from the second DOE 27. The incident angle 10 is different from the reflection angle 9. Essentially no light at the first wavelength is reflected in the second DOE 27. Depending on how the image module 4 is arranged the image of the eye at the first wavelength may be separated from the image of the eye at the second wavelength. The image module 4 may be arranged for separation of different colours. In that case the control unit may split the image in two by image analysis. The split images correspond to the image at the first wavelength and the image at the second wavelength. The increased amount of information with two images from different angles improves the eye tracking. In case the image module 4 is not colour sensitive the images may be separated by controlling the first illuminator 5 and the second illuminator 25 such that only one illuminator is illuminating at the same time. Thus, two images are registered repeatedly. The frequency of the switching is set to be sufficiently high to follow the eye movement in real time. The frequency of the switching of the illuminators should preferably be at least 50 HZ. It may be advantageous to use switching of the illuminators 5, 25, even if the image module 4 is able to separate between colours.

Figure 3:
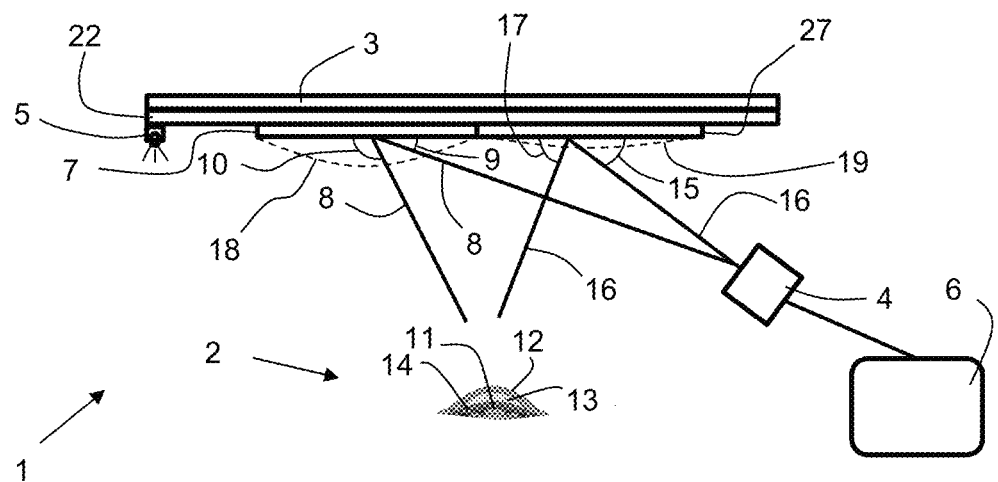
FIG. 3 is a schematic illustration of the eye tracking device according to another embodiment of the invention, having one illuminator.

FIG. 3 is a schematic illustration of the eye tracking device 1 according to another embodiment of the invention. One difference between the embodiment of FIG. 2 and the embodiment of FIG. 3 is that in the embodiment in FIG. 3 both DOEs have a lens effect and that the eye tracking device of FIG. 3 only comprises one illuminator 5, directly facing the eye 2. Thus, the first DOE 7 has a lens effect as is indicated by the first dashed line 18 and the second DOE 27 has a lens effect as is indicated by the second dashed line 19. The first DOE 7 may have a shorter focal length than the second DOE 27 to compensate for the distance being longer between the image module 4 and the first DOE 7 than between the image module 4 and the second DOE 27. This is indicated by the larger curvature of the first dashed line. An advantage, of that each of the first and second DOEs 7, 27 has a lens effect, is that the image module may be chosen without any strict limitations on the focal length of the image module. The image of the eye may be placed in focus of the image module by choosing the proper focal lengths of the lens effect of each of the DOEs 7, 27. The DOEs 7, 27 may be arranged on the support structure 22. In this embodiment, the support structure 22 may be arranged on a viewing plane 3 for displaying an image to the eye 2 of a user. This facilitates the arrangement of the DOEs 7, 27, in the eye tracking device. However, it is possible to arrange the DOEs 7, 27 next to each other, without the support structure 22. The viewing plane 3 may be any type of display, including any type of 3D display, such as a stereo display, a volumetric display, a holographic display, a retinal scanning display.

Further, the viewing plane 3 may be a waveguide connected to a projector or display (not shown) that is placed elsewhere. In case the viewing plane 3 is a waveguide, the first DOE 7 (and if applicable, the second DOE 27) can be incorporated or attached directly on the waveguide, without an intermediate support structure. In other words, in this case the waveguide can be seen as the support structure 22. Yet further, the viewing plane 3 may be a transparent display for augmented reality or mixed reality applications, a non-transparent display for virtual reality applications. However, it is also possible that no viewing plane 3 is present.

In a further embodiment of the present invention, where a DOE is placed adjacent to a lens, such as may be the case where the DOE is a holographic film or mirror, and the lens is curved, the focal length of the DOE may be designed such that the DOE functions as an advanced lens, for example having aspherical or cylindrical properties. The DOE will in this way counteract any curvature of the lens to function in the intended manner to direct light toward an image module.

By way of example, the focal length of the DOE may be the inverse of the focal length of the lens so as to result in an approximately flat mirror effect. Such a mirror effect may have a virtual curvature that effects how the light is reflected. In an alternative example, a lens effect may be added to the DOE to revert light dependent upon its incident angle.

In order to create such a lens effect, laser is applied to the DOE to alter the refractive index of the DOE, or alternatively sub-wavelength structures may be added to the DOE to create such a lens effect.

Figure 4:
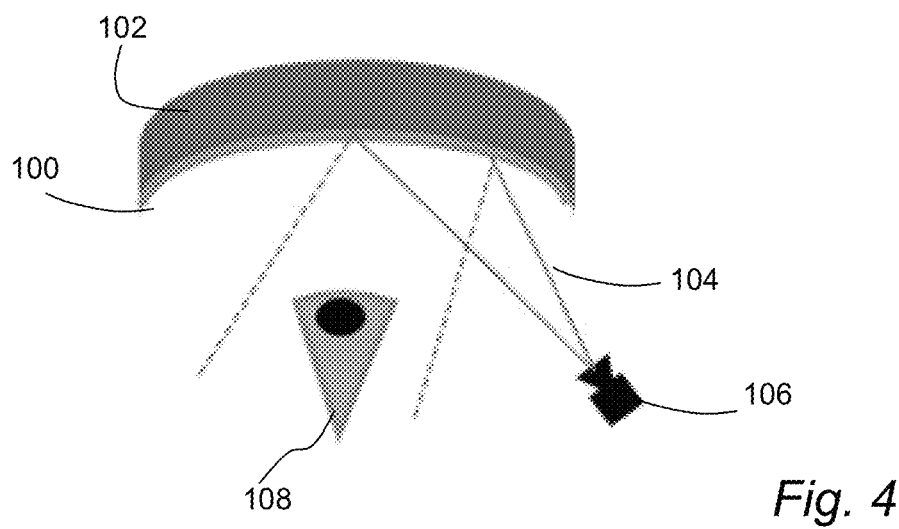
FIG. 4 is a schematic illustration of the eye tracking device according to an embodiment.
Figure 5:
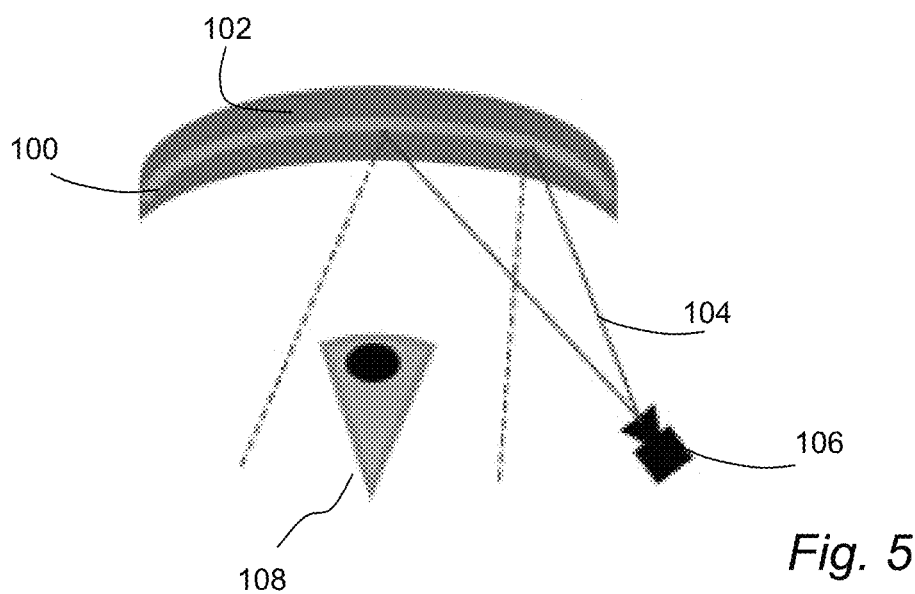
FIG. 5 is a schematic illustration of the eye tracking device according to an embodiment.

With reference to FIGS. 4 and 5, a DOE 100 may be located adjacent to lens 102 according to the further embodiment. The effect of the adjusted focal length of the DOE 100 is shown on the field of the view 104 of the camera 106, whereby the DOE 100 is directing the field of view 104 to encompass the eye 108.

FIG. 5 demonstrates further embodiment where the DOE 100 is positioned within the lens 102, rather than adjacent thereto. The DOE may be arranged within the lens during a moulding process or sandwiched between the elements constituting a lens, which will be known to a skilled person. The curvature of the DOE may have a different curing than the surface of the lens, while the lens closer to the user's eye, may have an optical effect. The optical effect will depend on the refractive index of the material of the lens and also, alternatively or in addition, dependent on the general shape of the lens. Such a curved DOE when paired with the optical effect of the lens material on top of the DOE distorts the image of the user's eye when viewing by the holographic mirror or lens. This distortion may negatively affect the eye-tracking device. The negative effects may include incorrect focus of the eye, image distortion which results in incorrect or imparted eye detection in the images or even different image distortions and size in different design by adding several perspectives that increases variation in the images analyzed by machine-learning or deep learning algorithms. By knowing the parameters of the curvature of the DOE, thickness of the lenses on top of the DOE, relative position of the camera and the nominal eye position, the negative effects can be accounted for in terms of proving a lens effect. The eye tracking becomes more efficient.

The above described embodiments may be modified in many ways without departing from the scope of the present invention which is limited only by the appended claims.

It is possible to have the two illuminators 5, 25, at the plane of the DOEs similarly to how the first illuminator 5 is arranged in FIG. 1.

The invention claimed is:

1. An eye tracking device for tracking an eye, comprising:
   a first lens;
   a first diffractive optical element (DOE), arranged adjacent to the first lens and in front of the eye;
   an image module, wherein the image module is configured to capture an image of the eye via the first DOE, wherein the first DOE is adapted to direct a first portion of incident light reflected from the eye towards the image module,
   wherein the first DOE is configured to provide a lens effect; and
   wherein the first DOE and the second DOE are positioned side by side, as seen from the eye, or
   wherein the first DOE and the second DOE are positioned at least partly overlapping, as seen from the eye.

2. The eye tracking device according to claim 1, wherein a focal length of the DOE is adapted to direct the first portion of incident light such as to give a sharp image of the eye in the image module.

3. The eye tracking device according to claim 1, wherein a focal length of the DOE is an inverse of a focal length of the first lens.

4. The eye tracking device according to claim 1, further comprising a second DOE adjacent to the first DOE, wherein the second DOE is adapted to direct a second portion of incident light reflected from the eye, towards the image module.

5. The eye tracking device according to claim 4, wherein the second DOE is configured to provide a lens effect, wherein a focal length of the second DOE is adapted to direct the second portion of incident light such as to give a sharp image of the eye in the image module, and wherein the focal length of the second DOE is different from a focal length of the first DOE.

6. The eye tracking device according to claim 4, wherein one or more of the first DOE and the second DOE is arranged on a support structure.

7. The eye tracking device according to claim 1, wherein the first DOE is part of a support structure.

8. The eye tracking device according to claim 6, wherein the support structure is transparent and comprises a polymer halide or a silver halide.

9. The eye tracking device according to claim 6, wherein the support structure has a thickness in an interval of 2-1000 micrometers ($\mu m$), an interval of 2-200 $\mu m$, or an interval of 10-100 $\mu m$.

10. The eye tracking device according to claim 1, wherein a viewing plane is arranged in a vicinity of or in contact with the first DOE.

11. The eye tracking device according to claim 1, further comprising at least one illuminator configured to produce the incident light, the incident light being within a wavelength range of 650-3000 nanometers (nm).

12. The eye tracking device according to claim 1, comprising at least one illuminator configured to produce the incident light, the incident light being within a wavelength range of 700-1500 nm.

13. The eye tracking device according to claim 1, comprising at least one illuminator configured to produce the incident light, the incident light being within a wavelength range of 800-1000 nm.

14. The eye tracking device according to claim 11, wherein the first portion of incident light has a first wavelength and the second portion of incident light has a second wavelength, and wherein the at least one illuminator comprises a first illuminator configured to emit light at the first wavelength and a second illuminator configured to emit light at the second wavelength, wherein the second wavelength is different from the first wavelength.

15. The eye tracking device according to claim 14, wherein one of the first wavelength and the second wavelength is in a range 840-860 nanometers (nm), and the other of the first wavelength and the second wavelength is in a range 930-950 nm.

16. The eye tracking device according to claim 1, wherein the first DOE is any of:
- a holographic optical element comprising a volumetric reflection hologram produced by interfering two or more beams or a computer-generated hologram;
- binary optics made by staircases that approximate an ideal surface relief;
- a hybrid lens with combined refractive and diffractive power; or
- a Fresnel zone plate.

17. The eye tracking device according to claim 1, further comprising a control unit adapted to:
- receive an image captured by the image module, and
- calculate a viewing angle of the eye.

18. The eye tracking device according to claim 1, wherein the eye tracking device comprises a head-worn device.

19. The eye tracking device according to claim 18, wherein the head-worn device comprises one of:
- glasses for eye-tracking;
- an augmented reality headset, wherein a transparent viewing plane is one of (A) integrated into the DOE, (B) attached to the DOE or (C) arranged in a vicinity of the DOE; or
- a virtual reality headset, comprising a viewing plane, wherein the DOE is one of (a) integrated into the viewing plane, (b) attached in front of the viewing plane or (c) arranged in front of the viewing plane.

* * * * *